(12) United States Patent
Krasner et al.

(10) Patent No.: US 11,733,994 B2
(45) Date of Patent: Aug. 22, 2023

(54) SYSTEM AND METHOD FOR STATE MANAGEMENT

(71) Applicant: EMC IP Holding Company LLC, Hopkinton, MA (US)

(72) Inventors: Jonathan I. Krasner, Coventry, RI (US); Li Lang, West Roxbury, MA (US); Avraham Goldin, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 833 days.

(21) Appl. No.: 16/403,307

(22) Filed: May 3, 2019

(65) Prior Publication Data

US 2020/0348922 A1 Nov. 5, 2020

(51) Int. Cl.
  *G06F 9/44* (2018.01)
  *G06F 8/654* (2018.01)

(52) U.S. Cl.
  CPC .................................. *G06F 8/654* (2018.02)

(58) Field of Classification Search
  CPC ....................................................... G06F 8/654
  USPC ....................................................... 717/169
  See application file for complete search history.

(56) References Cited

U.S. PATENT DOCUMENTS

| | | | | |
|---|---|---|---|---|
| 5,487,041 A * | 1/1996 | Wada | ..................... | G11C 29/84 365/201 |
| 5,579,522 A * | 11/1996 | Christeson | .......... | G06F 11/1433 713/2 |
| 7,020,696 B1 * | 3/2006 | Perry | .................. | H04L 41/0856 709/217 |
| 7,376,870 B2 * | 5/2008 | Kataria | ............... | G06F 11/1433 714/E11.135 |
| 8,073,990 B1 * | 12/2011 | Baron | ..................... | G06F 13/28 710/22 |
| 9,710,250 B2 * | 7/2017 | Johnson | .................... | G06F 8/65 |
| 10,705,966 B1 * | 7/2020 | Rub | ....................... | G06F 11/1068 |
| 10,896,070 B2 * | 1/2021 | Rao | ....................... | G06F 11/3476 |
| 2014/0059530 A1 * | 2/2014 | Banavalikar | .......... | G06F 9/4406 717/170 |
| 2015/0363186 A1 * | 12/2015 | Judge | ........................ | G06F 8/65 717/170 |
| 2022/0027285 A1 * | 1/2022 | Yudanov | ............. | G06F 12/0802 |

\* cited by examiner

*Primary Examiner* — Evral E Bodden
(74) *Attorney, Agent, or Firm* — Chamberlain, Hrdlicka, White, Williams & Aughtry

(57) ABSTRACT

A data processing device for providing data storage services includes memory, persistent storage, and a device manager. The persistent storage stores a code repository. The state manager obtains a code update request for a new state for the device manager; injects state manager code to begin execution of the state manager in response to obtaining the code update request; updates the device manager data using the code repository and a memory region state map to obtain an updated device manager; and extracts the state manager code to resume execution of the updated device manager.

20 Claims, 14 Drawing Sheets

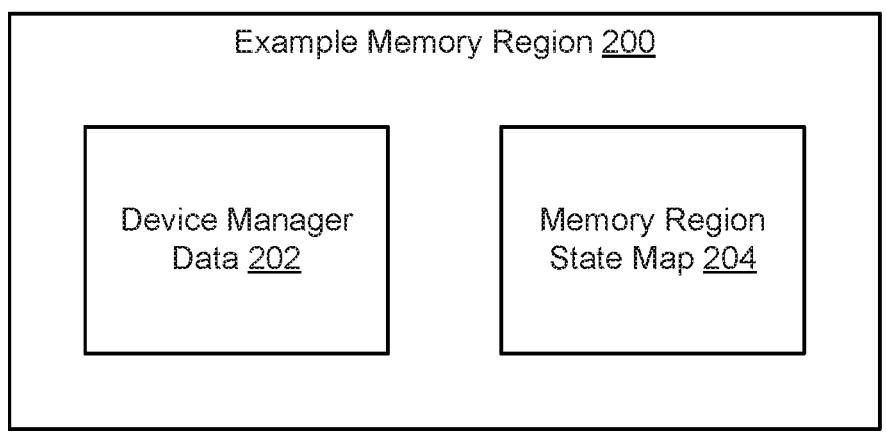
FIG. 2.1

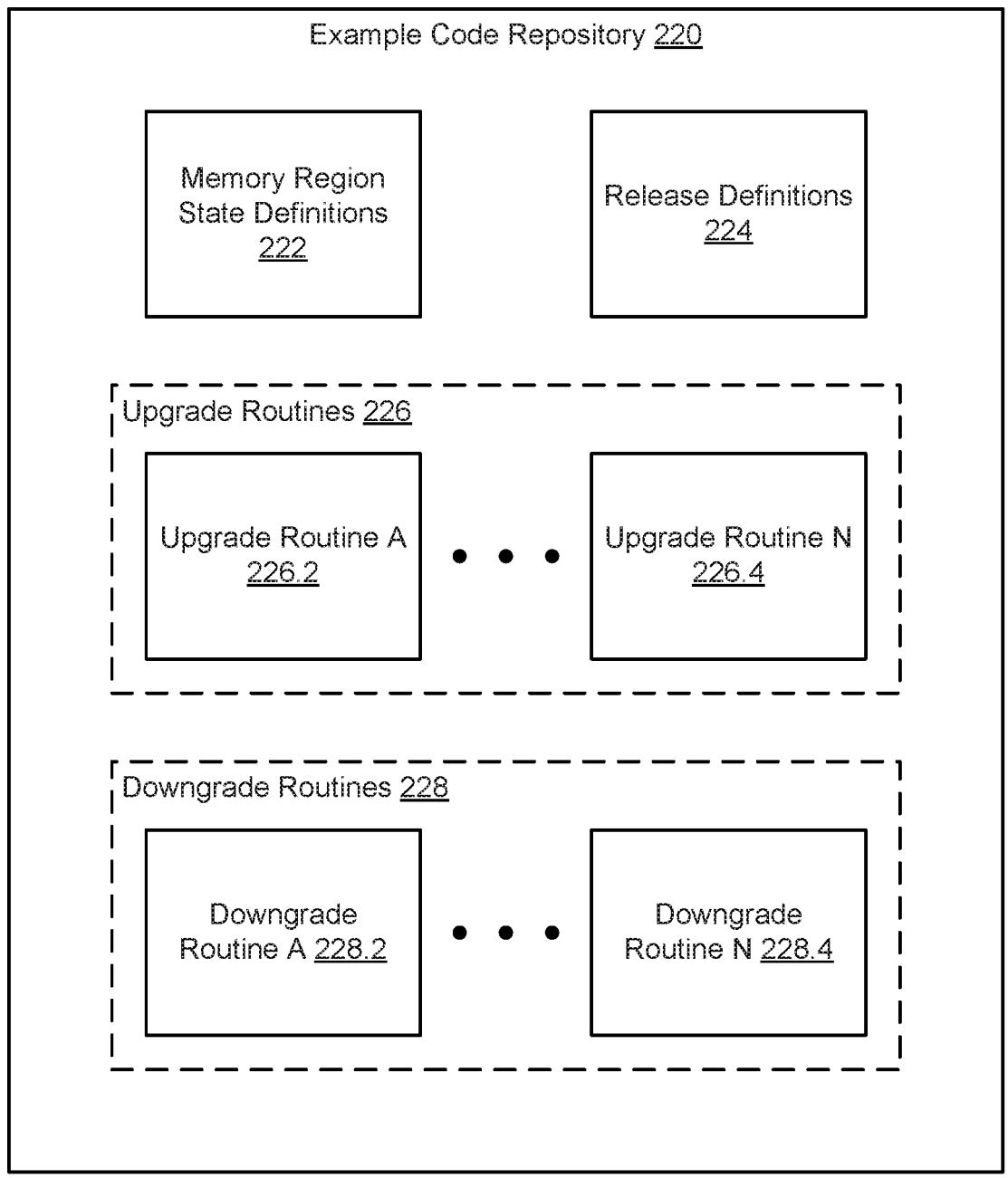
FIG. 2.2

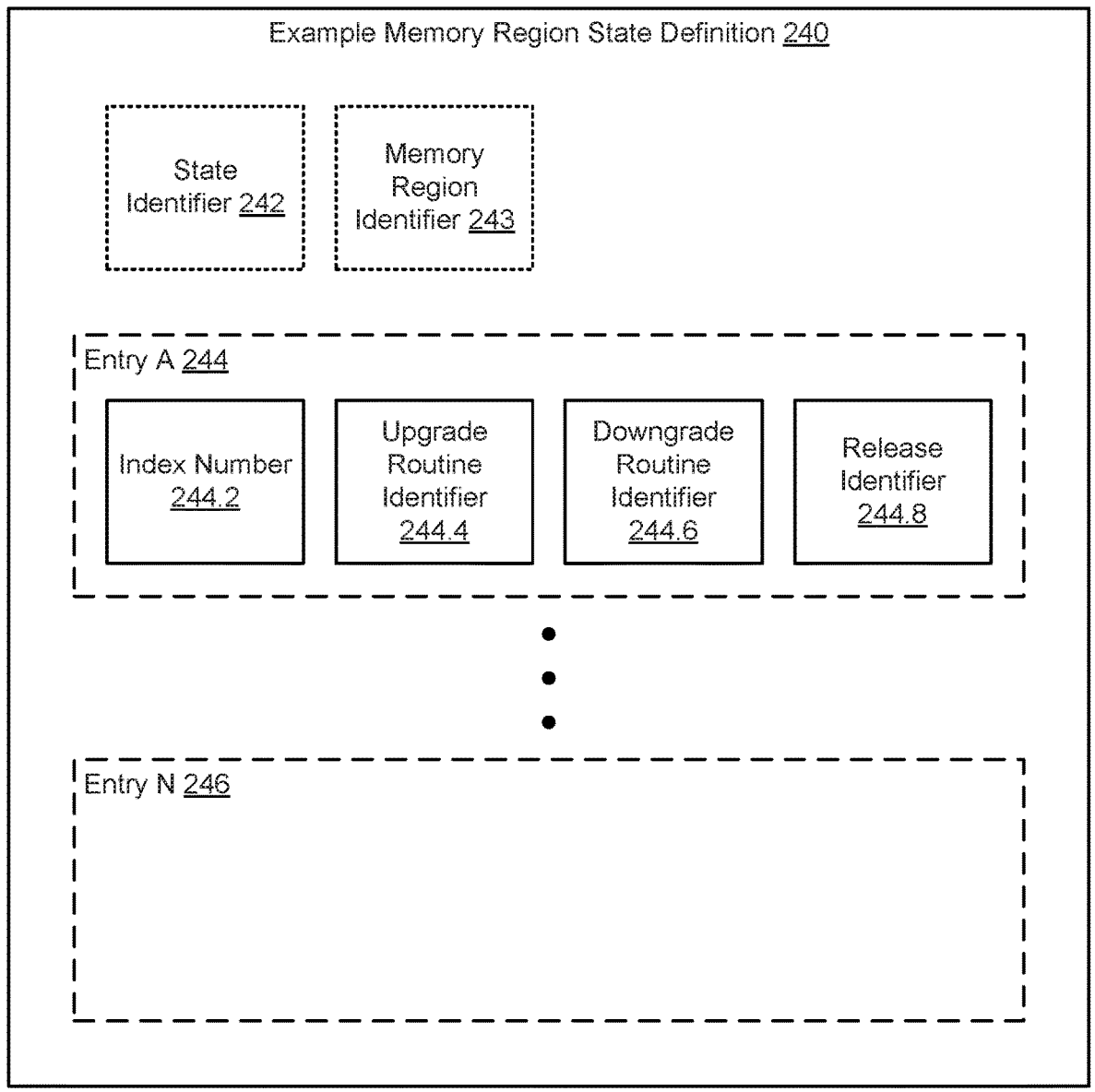
FIG. 2.3

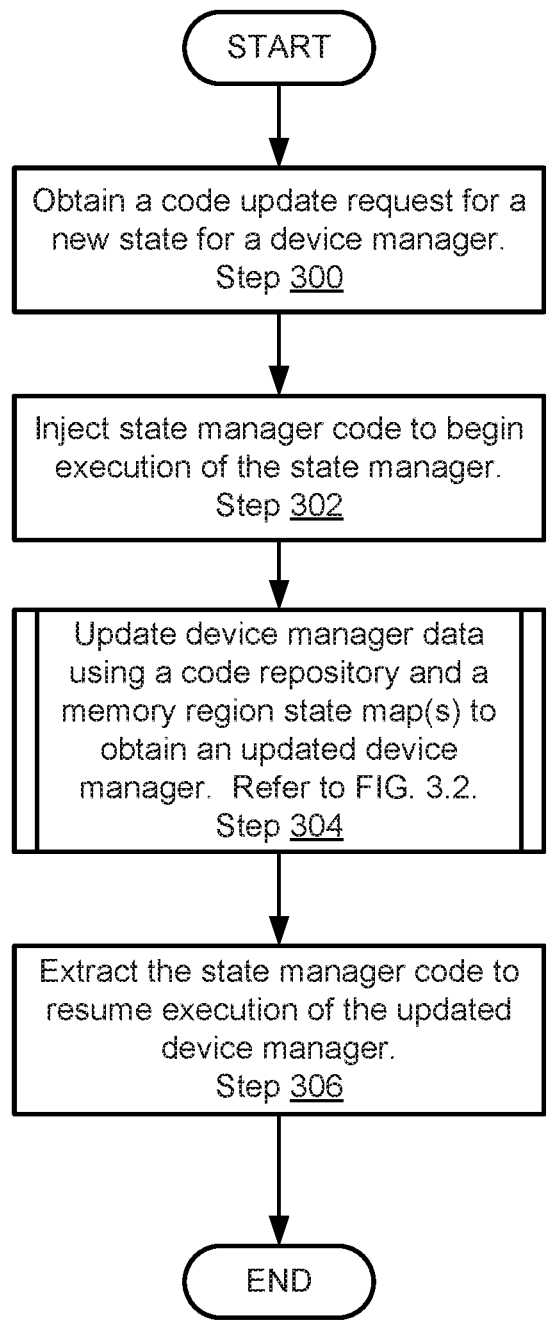
FIG. 3.1

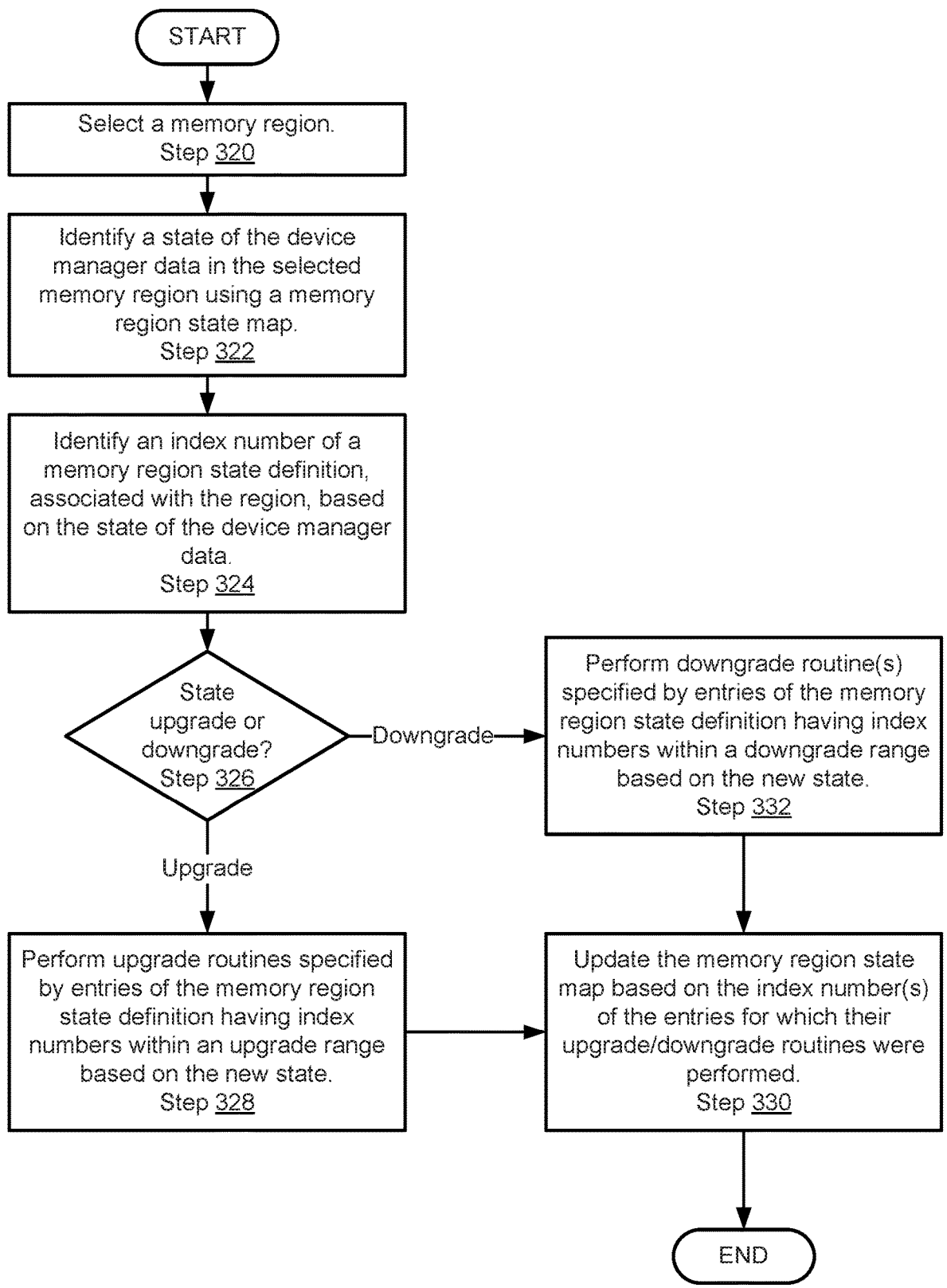
FIG. 3.2

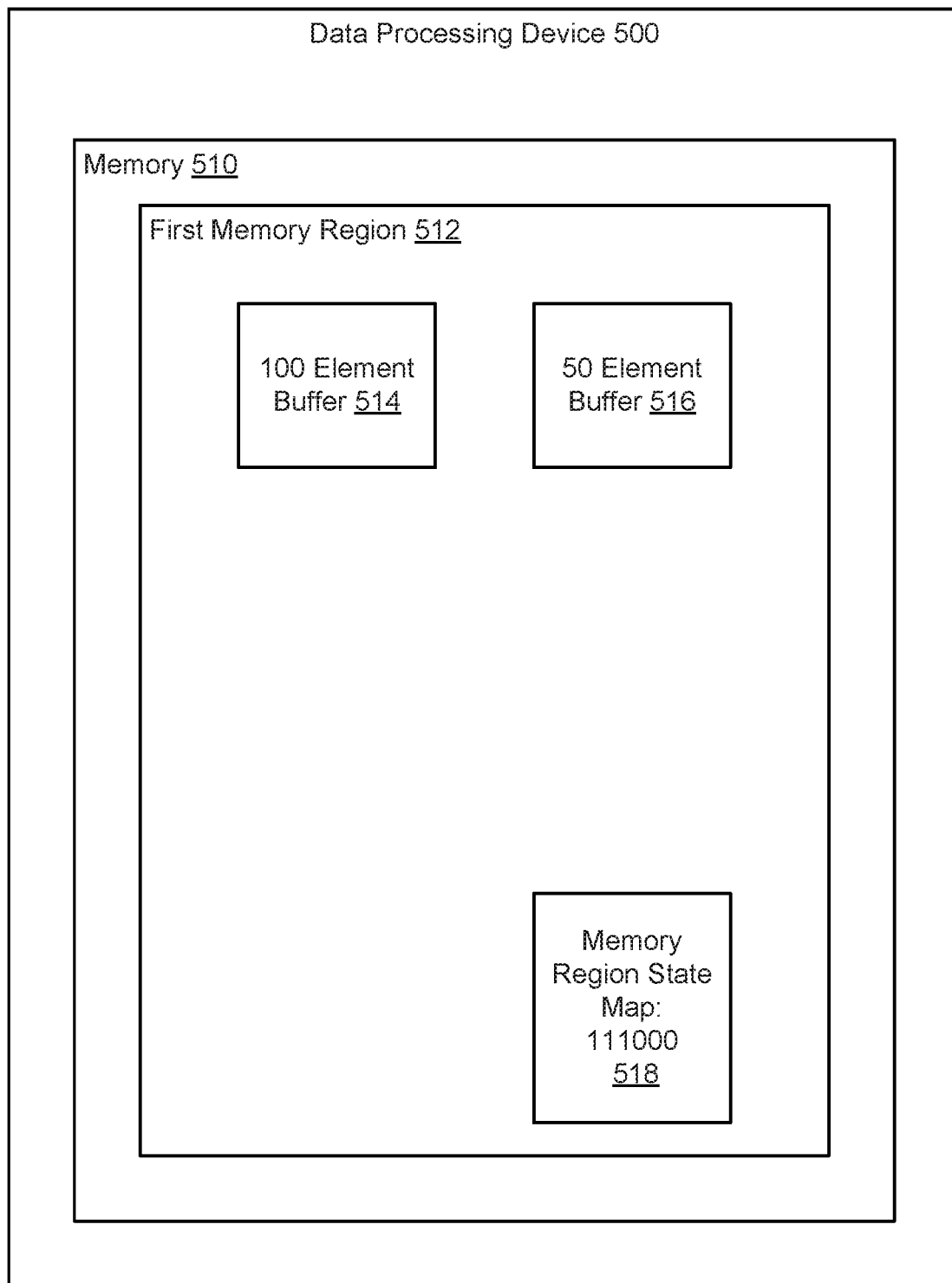
FIG. 5.1

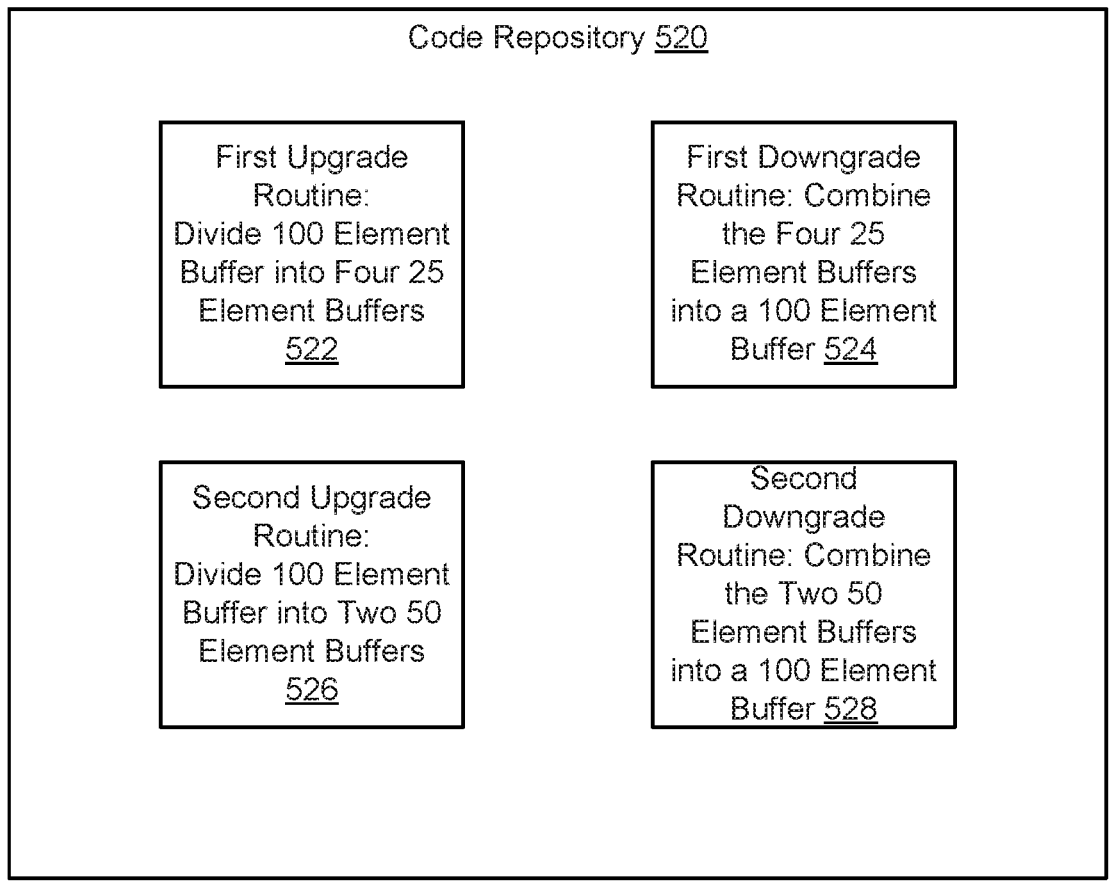
FIG. 5.2

Memory Region State Definition 540

Fourth Entry:
Index Number – 4
Upgrade Routine – First Upgrade Routine
Downgrade Routine – First Downgrade Routine
Release Identifier – Branch A
542

Fifth Entry:
Index Number – 5
Upgrade Routine – Second Upgrade Routine
Downgrade Routine – Second Downgrade Routine
Release Identifier – Branch B
544

FIG. 5.3

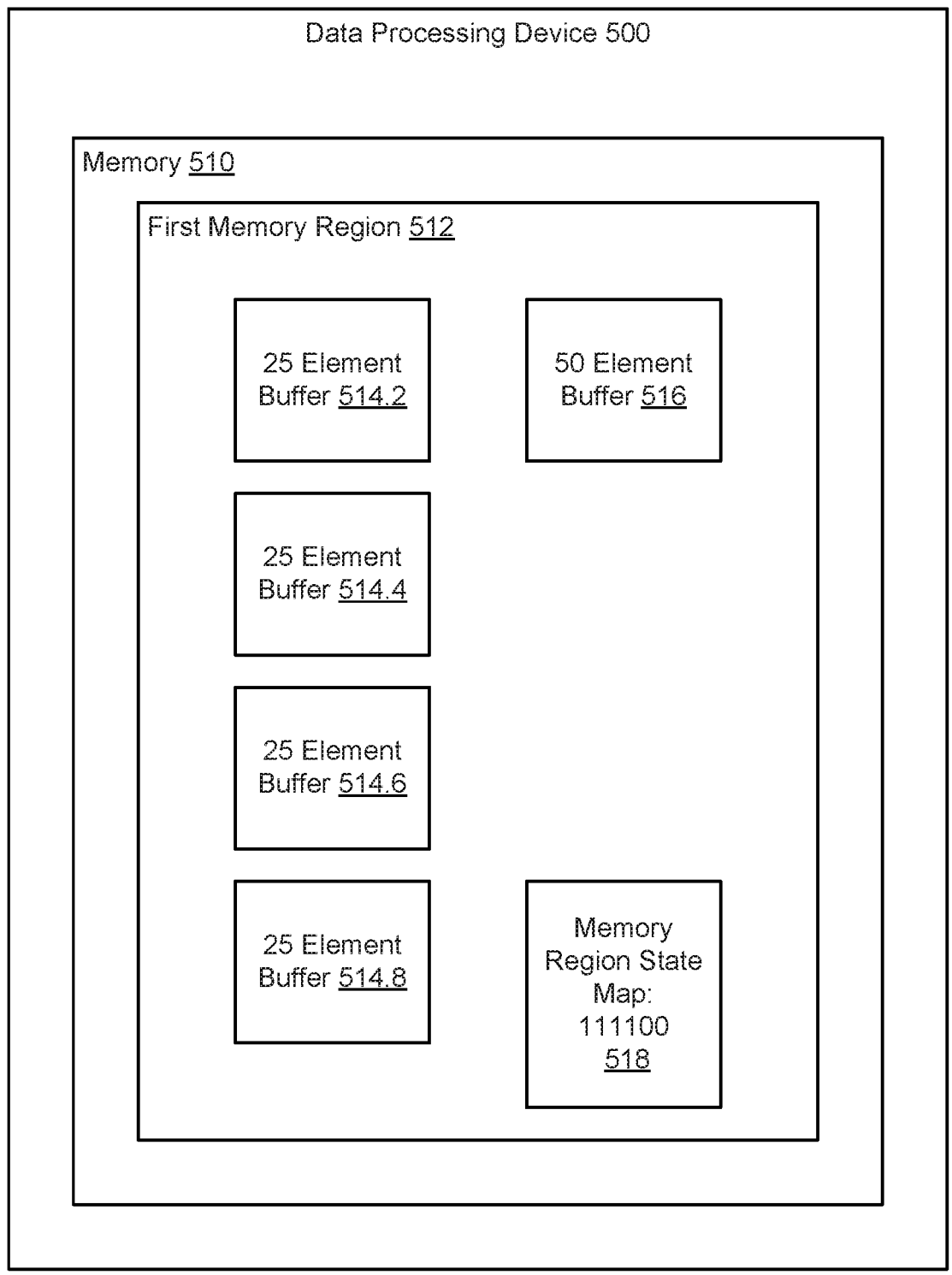
FIG. 5.4

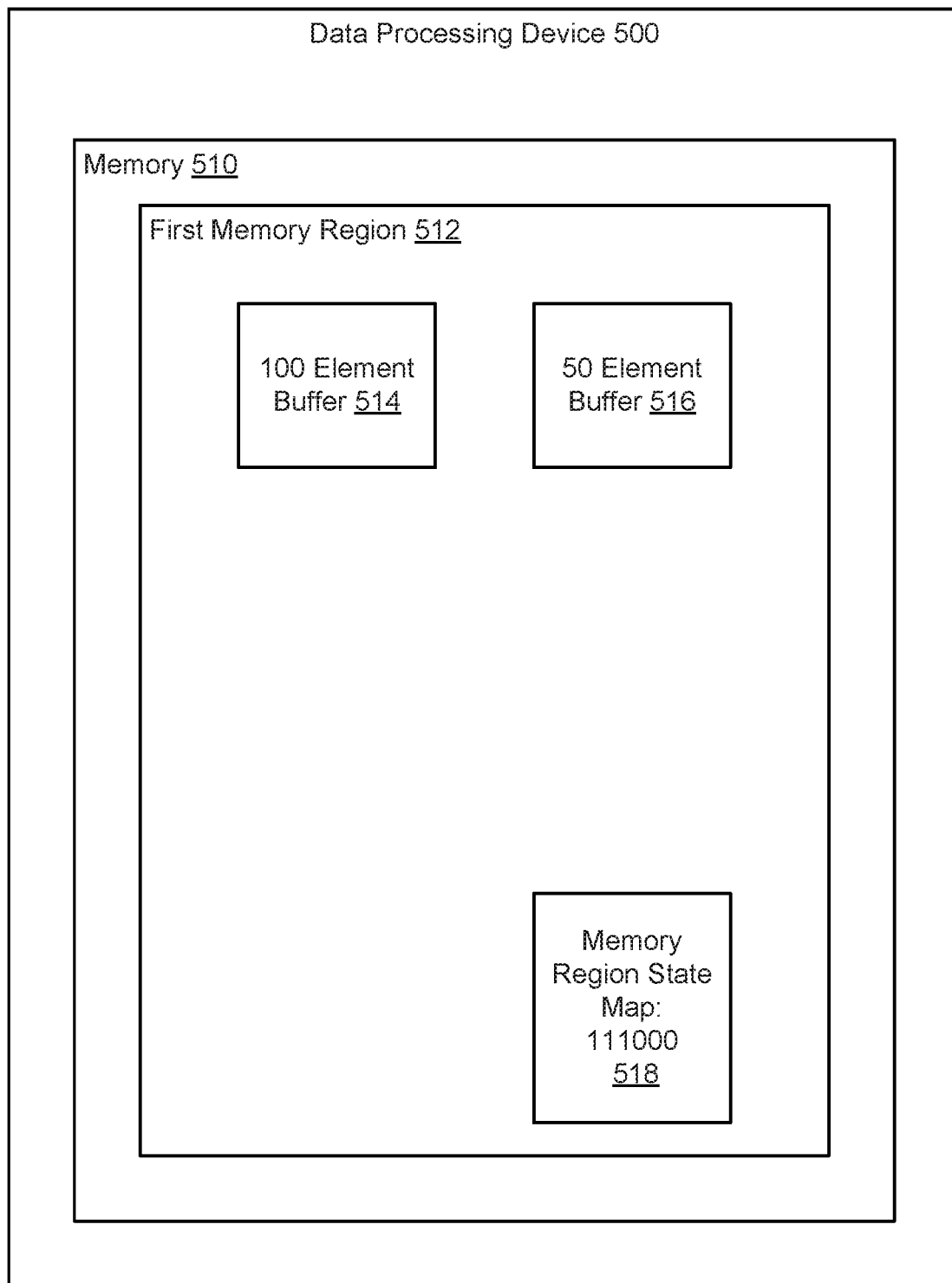
FIG. 5.5

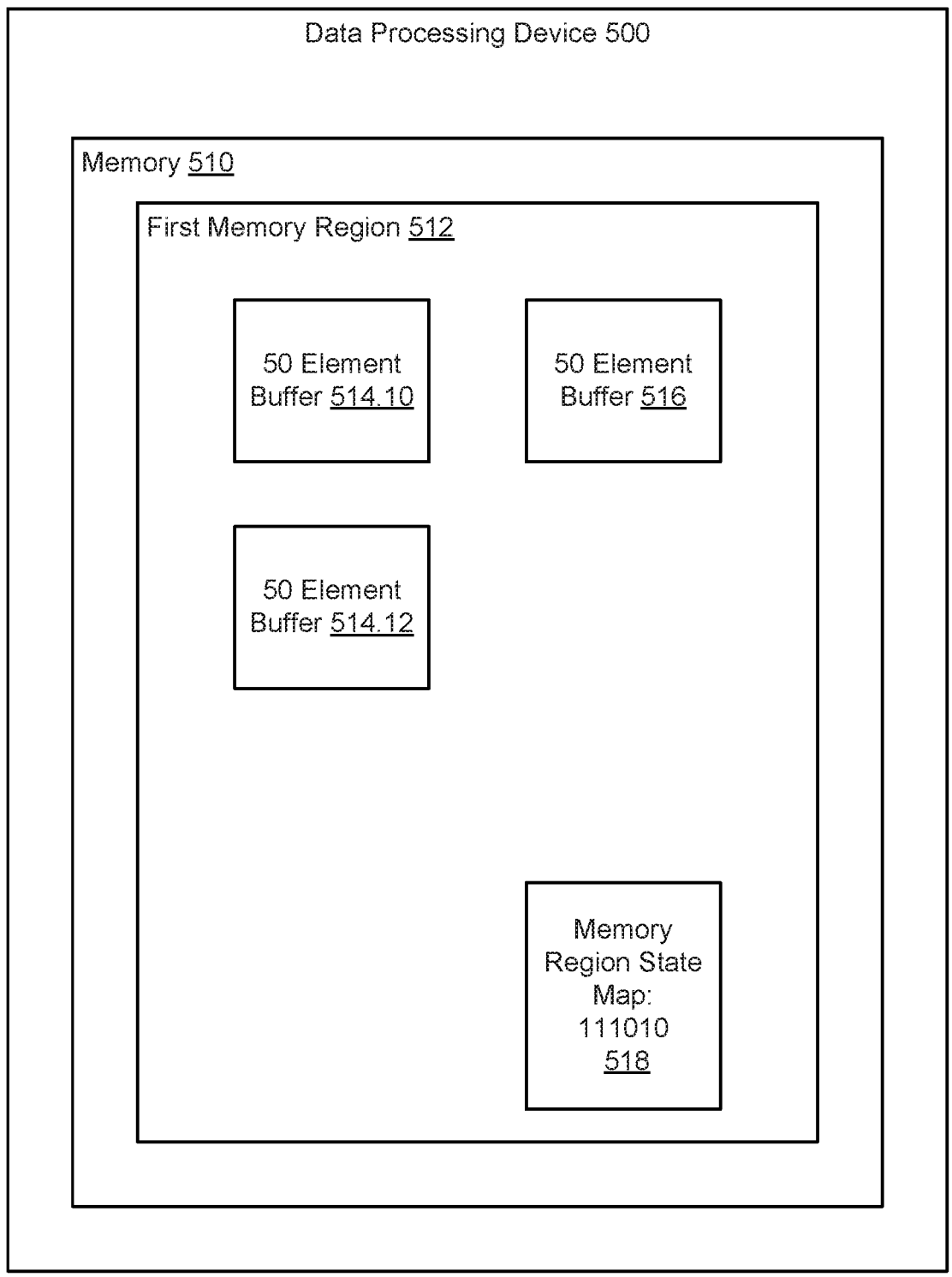
FIG. 5.6

SYSTEM AND METHOD FOR STATE MANAGEMENT

BACKGROUND

Computing devices may generate data during their operation. For example, applications hosted by the computing devices may generate data used by the applications to perform their functions. Such data may be stored in persistent storage of the computing devices.

Data generated by computing devices may also be stored remotely from the computing devices. Such remote storage may be utilized to, for example, redundantly store multiple copies of data for data protection purposes, free storage space by storing the data without utilizing persistent storage of the computing devices, or for other reasons.

SUMMARY

In one aspect, a data processing device for providing data storage services in accordance with one or more embodiments of the invention includes memory, persistent storage, and a device manager. The persistent storage stores a code repository. The state manager obtains a code update request for a new state for the device manager; injects state manager code to begin execution of the state manager in response to obtaining the code update request; updates the device manager data using the code repository and a memory region state map to obtain an updated device manager; and extracts the state manager code to resume execution of the updated device manager.

In one aspect, a method for providing data storage services in accordance with one or more embodiments of the invention includes obtaining a code update request for a new state of a device manager; injecting state manager code to begin execution of a state manager in response to obtaining the code update request; updating device manager data using a code repository and a memory region state map to obtain an updated device manager, wherein the device manager data is stored in a memory region of memory of a data processing device hosting the device manager; and extracting the state manager code to resume execution of the updated device manager that provides the data storage services.

In one aspect, a non-transitory computer readable medium in accordance with one or more embodiments of the invention includes computer readable program code, which when executed by a computer processor enables the computer processor to perform a method for providing data storage services. The method including obtaining a code update request for a new state of a device manager; injecting state manager code to begin execution of a state manager in response to obtaining the code update request; updating device manager data using a code repository and a memory region state map to obtain an updated device manager, wherein the device manager data is stored in a memory region of memory of a data processing device hosting the device manager; and extracting the state manager code to resume execution of the updated device manager that provides the data storage services.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example memory region in accordance with one or more embodiments of the invention.

FIG. 2.2 shows a diagram of an example code repository in accordance with one or more embodiments of the invention.

FIG. 2.3 shows a diagram of an example state definition in accordance with one or more embodiments of the invention.

FIG. 3.1 shows a flowchart of a method of providing data storage services in accordance with one or more embodiments of the invention.

FIG. 3.2 shows a flowchart of a method of obtaining an updated device manager that provides the data storage services in accordance with one or more embodiments of the invention.

FIGS. 5.1-5.6 show a non-limiting example of a system in accordance with embodiments of the invention.

DETAILED DESCRIPTION

Figure 1:
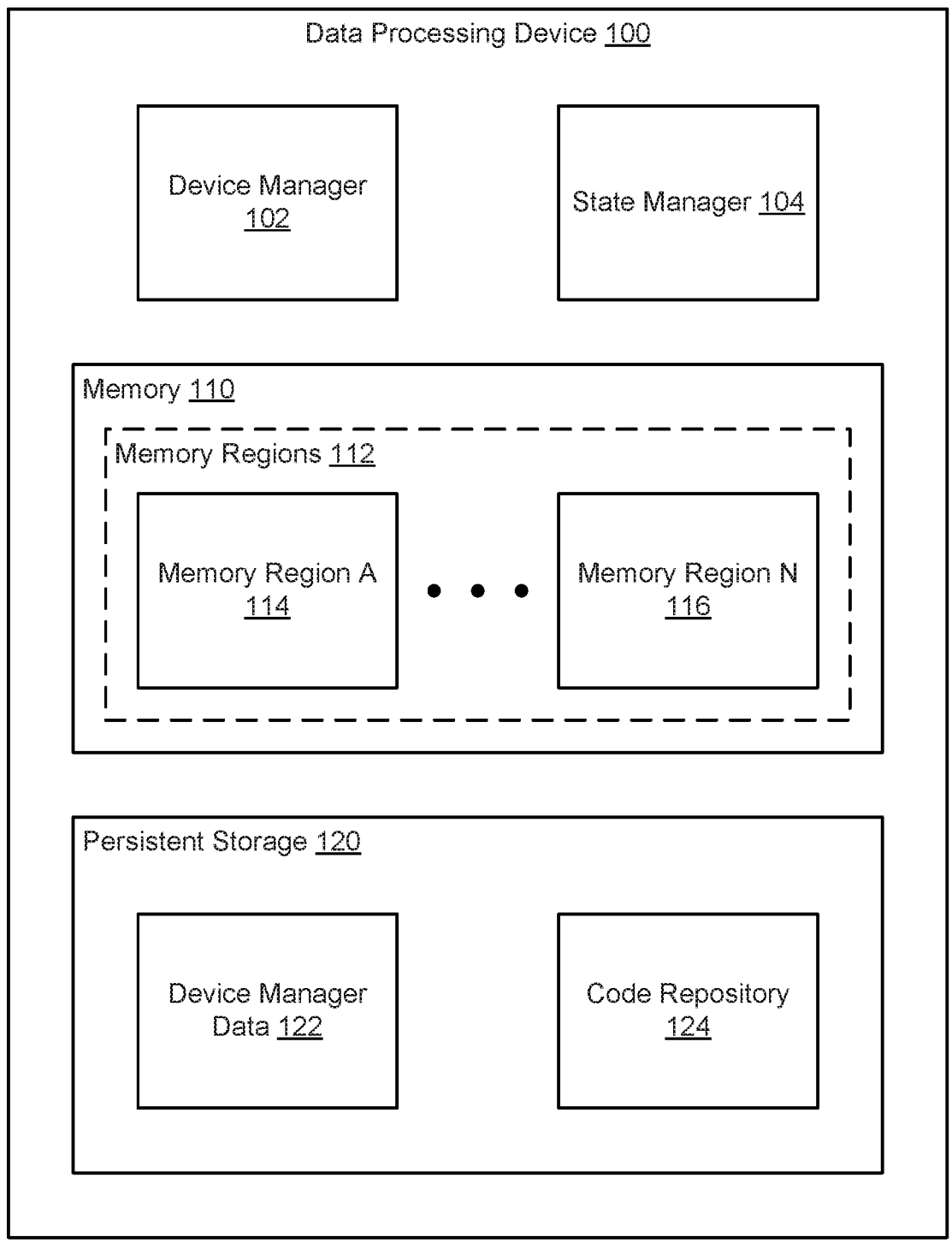
FIG. 1 shows a diagram of a data processing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing the functionality a data processing device. The functionality of a data processing device may depend on the contents and/or structure of data stored in memory. For example, the type, content, and arrangement of data in memory may impact the manner in which executing entities are operating. Consequently, the functionality of such executing entities may be modified by modifying the contents of the memory.

To manage the functionality of the data processing device, embodiments of the invention may provide a method for modifying the contents of the memory while continuing to provide the functionality of the data processing device. By doing so, embodiments of the invention may provide a method for modifying the functionality of the data processing device that is transparent to users of services provided by the data processing device. Thus, embodiments of the invention may provide a method for modifying the function of a data processing device without interrupting services provided to the users.

Further embodiments of the invention may provide a method for tracking the operating state of executing entities based on modifications made to the contents of memory. For example, as the contents of the memory is modified, such changes may be noted to identify a new operating state of the executing entities caused by the modifications to the memory. By doing so, the operating state of the executing entities may be tracked to enable such modifications to be rolled back in the event of the modifications leading to undesirable behavior of the data processing device.

FIG. 1 shows a data processing device (100) in accordance with one or more embodiments of the invention. The data processing device (100) may provide data storage services to other entities (not shown). The data storage services may include storing data from the entities and providing previously stored data to the entities.

Additionally, as part of providing the data storage services, the data processing device (100) may perform in-operation modifications of the manner in which it provides the data storage services. An in-operation modification is a modification of data structures utilized by the data processing device (100) for providing the data storage services in a manner that is transparent to the clients. In other words, the in-operation modification may change the manner in which the data storage services are provided to the clients without the clients perceiving a degradation of the quality of the data storage services.

For example, an in-operation modification may cause the data processing device (100) to perform a routine that modifies in-memory data structures. The in-memory data structures may impact the manner in which the data processing device (100) provides the data storage services. Thus, by modifying the in-memory data structures the manner in which data storage services are provided by the data processing device (100) may be modified.

The data processing device (100) may be operably connected to any number of devices via any combination of wireless and/or wired networks. The data processing device (100) may provide the data storage services using these operable connections.

The data processing device (100) may include computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions (in addition to other data), e.g., computer code, that (when executed by the processor(s) of the computing device) cause the computing device to perform the functions of the data processing device (100) described in this application and/or all, or a portion, of the methods illustrated in FIGS. 3.1-3.2. The data processing device (100) may include other types of computing devices without departing from the invention. For additional details regarding computing devices, refer to FIG. 6.

In one or more embodiments of the invention, the data processing device (100) is a distributed computing device.

As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the data processing device (100) may be performed by multiple, different computing devices without departing from the invention.

To provide the functionality of the data processing device (100), any of the computing devices of the data processing device (100) may include computer instructions, e.g., computer code, that when executed by one or more processors of the computing devices of the data processing device (100) cause the computing devices of the storage to perform the functions described in this application and/or all, or a portion, of the methods illustrated in FIGS. 3.1-3.2.

In one or more embodiments of the invention, all, or a portion, of the computing devices of the data processing device (100) include special purpose computing devices. The special purpose computing devices may be, for example, storage controllers, raid controllers, load balancers, and/or any other type of special purpose computing devices for providing data storage services. The special purpose computing devices of the data processing device (100) may perform different and/or similar functions. The computing devices of the data processing device (100) may, when providing the functionality of the data processing device (100), invoke the functionality of the special purpose computing devices.

All or a portion of the data processing device (100) may be implemented using one or more logical devices without departing from the invention. For example, the data processing device (100) may include a virtual machine (or multiple virtual machines) that utilizes computing resources of any number of computing devices to provide the functionality of the data processing device (100). The data processing device (100) may be other types of logical devices without departing from the invention.

To provide the above noted functionality of the data processing device (100), the data processing device may include a device manager (102), a state manager (104), memory (110), and persistent storage (120). Each component of the data processing device (100) is discussed below.

In one or more embodiments of the invention, the device manager (102) performs the services provided to other entities by the data processing device (100) to other entities. As discussed above, the services may be data storage services. The device manager (102) may perform other types of services to provide the services to other entities without departing from the invention. The device manager (102) may perform any type and/or quantity of services (e.g., multiple, different types of services).

When performing such services, the device manager (102) may utilize device manager data stored in the memory (110) and/or the persistent storage (e.g., 122). The structure and/or contents of the device manager data may define how the device manager (102) performs services. In other words, the operation of the device manager (102) may vary depending on the device manager data stored in the memory (110). Thus, the operating state of the device manager (102) may correspond to the state of the device manager data stored in the memory (110).

In one or more embodiments of the invention, the device manager (102) is a hardware device including circuitry. The device manager (102) may be, for example, a digital signal processor, a field programmable gate array, or an application specific integrated circuit. The device manager (102) may be other types of hardware devices without departing from the invention.

In one or more embodiments of the invention, the device manager (102) is implemented as computing code stored on a persistent storage that when executed by a processor performs the functionality of the device manager (102). The processor may be a hardware processor including circuitry such as, for example, a central processing unit or a microcontroller. The processor may be other types of hardware devices for processing digital information without departing from the invention.

To provide the above noted functionality of the device manager (102), the device manager may perform all, or a portion, of the methods illustrated in FIGS. 3.1-4.

In one or more embodiments of the invention, the state manager (104) manages the operating state of the device manager (102). To do so, the state manager (104) may modify the device manager data in memory (110) into a state corresponding to desired operating state of the device manager (102).

The state manager (104) may manage the state manager data by utilizing information included in a code repository (124) stored in the persistent storage (120). As will be discussed in greater detail below, the code repository (124) may include information that may be used to modify the device manager data stored in the memory (110) to place the device manager (102) into different operating states. The device manager data may be modified into states corresponding to the different operating states. Consequently, the information included in the code repository (124) may be used to place the device manager (102) into a desired operating state.

In one or more embodiments of the invention, the state manager (104) is a hardware device including circuitry. The state manager (104) may be, for example, a digital signal processor, a field programmable gate array, or an application specific integrated circuit. The state manager (104) may be other types of hardware devices without departing from the invention.

In one or more embodiments of the invention, the state manager (104) is implemented as computing code stored on a persistent storage that when executed by a processor performs the functionality of the state manager (104). The processor may be a hardware processor including circuitry such as, for example, a central processing unit or a microcontroller. The processor may be other types of hardware devices for processing digital information without departing from the invention.

To provide the above noted functionality of the state manager (104), the state manager (104) may perform all, or a portion, of the methods illustrated in FIGS. 3.1-4.

In one or more embodiments of the invention, the memory (110) provides memory services to the device manager (102), the state manager (104), and/or other entities hosted by the data processing device (100). The memory services may be provided by storing device manager data and/or other types of data. The memory services may also be provided by storing device manager data and/or other types of data.

The memory (110) may include any number of hardware devices for providing memory services. For example, the memory (110) may include non-volatile memory devices (e.g., flash based devices), volatile memory devices (e.g., random access memory devices), and/or any other type of hardware memory devices. The memory (110) may also include any number of hardware devices for managing memory access (e.g., memory controllers). Some or all of the hardware devices may be shared among any number of entities (e.g., shared memory, common-global memory, etc.).

The memory (110) may be divided into any number of memory regions (112). A memory region (e.g., 114, 116) may be a logical allocation of the memory resources (i.e., memory storage space) of the hardware devices of the memory (110). Each of the memory regions (e.g., 114, 116) may include any quantity of the memory resources. Different memory regions (112) may include similar and/or different quantities of the memory resources.

Each of the memory regions (114) may store a portion of the device manager data and a memory region state map (204, FIG. 2.1). The memory region state map may be used to determine a state of the device manager data in the memory region in which the memory region state map is stored. For additional details regarding memory regions and/or memory region state maps, refer to FIG. 2.1.

In one or more embodiments of the invention, the persistent storage (120) provides data storage resources for the device manager (102), the state manager (104), and/or other entities. The data storage resources may enable the data processing device (100) to persistently store digital data. The persistent storage (120) may store data structures including device manager data (122) and the code repository (124). The persistent storage (120) may store additional, different, and or less data without departing from the invention. The persistent storage (120) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

The device manager data (122) may be a data structure that includes information used by the device manager (102) to provide the services that it offers. For example, if the device manager (102) is providing data storage services, the device manager data (122) may include information (e.g., copies of data from other entities) that enables that device manager (102) to store data and provide data. The device manager data (122) may include any quantity and or type information that enables the device manager (102) to provide any quantity and/or type of services without departing from the invention.

The code repository (124) may be a data structure that includes information that may be used by the state manager (104) to modify device manager data (122) stored in the memory (110) to change an operational state of the device manager (102) to different operational state. For additional details regarding the code repository (124), refer to FIG. 2.2.

While the persistent storage (120) is illustrated as including a limited amount of specific data, the persistent storage (120) may include any amount and/or type of data without departing from the invention. Additionally, while the device manager data (122) and the code repository (124) are illustrated as being separate data structures that include specific information and are stored in the persistent storage (120), each of these data structures may include additional, different, and/or less information; may be combined or divided into any number of other data structures; may be stored in other locations; and/or may be spanned across any number of storage devices hosted by any number of entities without departing from the invention.

As discussed above, memory regions (112) may store device manager data and/or a device memory region state map for the respective memory region. FIG. 2.1 shows a diagram of an example memory region (200) in accordance with one or more embodiments of the invention. The example memory region (200) may store device manager data (202) and a memory region state map (204). Each of these data structures is discussed below.

As discussed above, the device manager data (202) may be a data structure (or multiple data structures) that includes data that impacts how a device manager operates. For example, the device manager may use the data included in the device manager data (202) when performing its functionality. Consequently, the inclusion of different data in the device manager data (202) may impact the operation of the device manager.

The memory region state map (204) may be a data structure that enables a state manager to ascertain an operational state of the device manager associated with the device manager data (202). The memory region state map (204) may be, for example, a bit map. The contents of the bit map may indicate a structure and/or contents of the device manager data (202) that is associated with a corresponding operational state of the device manager. The memory region state map (204) may be used by the state manager to ascertain the contents and/or structure of the device manager data (202). By doing so, the state manager may be able to determine how to use information included in the code repository (124) to modify to device manager data (202) when attempting to modify the operational state of the device manager (102) to be in a desired operational state.

As will be discussed with greater detail with respect to FIG. 2.2, the code repository (124, FIG. 1) may include instructions for how to modify device manager data (202) in a first predetermined state associated with a first operational state of the device manager to place the device manager data (202) into a second predetermined state associated with a second operational state of the device manager. Thus, to make such modifications using the instructions, the state manager (104) may include functionality to identify a current state of the device manager data (202). The state manager may make such a determination based on the contents of the memory region state map (204).

To further clarify aspects of embodiments of the invention, FIG. 2.2-2.3 show examples of data structures that may be utilized by components of the data processing device (100) of FIG. 1.

FIG. 2.2 shows a diagram of an example code repository (220) in accordance with one or more embodiments of the invention. The example code repository (220) may be similar to the code repository (124, FIG. 1). As discussed above, the example code repository (220) may include information that may be used to modify device manager data in memory to place a device manager into different operating state.

The example code repository (220) may include memory region state definitions (222), release definitions (224), upgrade routines (226), and downgrade routines (228). Each of these data structures is discussed below.

The release definitions (224) may be a data structure (or multiple data structures) for different releases. A release may define an operating state of a device manager. In other words, a release may be a specific structure and/or contents of device manager data in memory that, when met, places the device manager into a predetermined operating state.

The release definitions (224) may include a list of releases. Each of the releases may specify any number of the memory region state definitions. As will be discussed in greater detail below, the release definitions may include information that may be used to place the device manager into the operating state associated with a release definition.

For example, a release may include identifiers of any number of the memory region state definitions (222). A state manager may use the identifiers to ascertain the memory region state definitions (222) that may be used to place device manager data in memory into states such that the device manager will operating in the operating state associated with the release.

The memory region state definitions (222) may be a data structure (or multiple data structures) that include information for how to modify device manager data in memory in a first predetermined state to place the device manager data in a second predetermined state. For additional information regarding the memory region state definitions, refer to FIG. 2.3.

The upgrade routines (226) may be data structures that include information regarding actions to be performed to modify device manager data in one or more memory regions. For example, the upgrade routines (226) may specify that a portion of the device manager data is to be moved to a new memory location, a size of a portion of the device manager data is to be changed, the information content of a portion of the device manager data is to be changed, etc.

Each of the upgrade routines (e.g., 226.2, 226.4) may be, for example, a list of actions. A state manager may perform each of the actions in the list of actions when performing an upgrade routine.

Each of the upgrade routines (e.g., 226.2, 226.4) may be, for example, executable code. A state manager may cause the executable code to be executed when performing an upgrade routine.

The upgrade routines (226) may be other types of data structures and/or include different types of information for modifying device manager data without departing from the invention.

The downgrade routines (228) may be data structures that include information regarding actions to be performed to modify device manager data in one or more memory regions. For example, the downgrade routines (228) may specify that a portion of the device manager data is to be moved to a new memory location, a size of a portion of the device manager data is to be changed, the information content of a portion of the device manager data is to be changed, etc.

Each of the downgrade routines (e.g., 228.2, 228.4) may be, for example, a list of actions. A state manager may perform each of the actions in the list of actions when performing a downgrade routine.

Each of the downgrade routines (e.g., 228.2, 228.4) may be, for example, executable code. A state manager may cause the executable code to be executed when performing a downgrade routine.

There may be a downgrade routine of the downgrade routines (e.g., 228.2, 228.4) corresponding to each of the upgrade routines (226). Because each of the respective routines specify modifications, rather than states, the corresponding routines may be used to change the state of device manager data in memory back and forth between states associated with different operating states of the device manager. Consequently, any number of such upgrade and downgrade routines may be used to transition the device manager data between different states associated with different operating states of the device manager. Thus, the upgrade and downgrade routines may be used to modify the operating state of the device manager to correspond to any of the operating states associated with the respective releases of the release definitions (224).

Turning to FIG. 2.3, FIG. 2.3 shows a diagram of an example memory region state definition (240) in accordance with one or more embodiments of the invention. The example memory region state definitions (240) may be similar to a memory region state definition of the memory region state definitions (224, FIG. 2.2). As discussed above, the example memory region state definition (240) may include information that may be used to modify device manager data in a memory region of the memory (110, FIG. 1).

The example memory region state definition (240) may include a state identifier (242), a memory region identifier (243), and any number of entries (e.g., 244, 246). Each of the entries (e.g., 244, 246) may include an index number (244.2), an upgrade routine identifier (244.4), a downgrade routine identifier (244.6), and a release identifier (244.8). Each of these data structures is discussed below.

The state identifier (242) may be an identifier of a state of device manager data. As discussed above, the state of the device manager data may be associated with a corresponding operating state of the device manager. Thus, the state identifier (242) may be used to identify an operating state of the device manager that is associated with the example memory region state definition (240).

The memory region identifier (243) may be an identifier of a memory region of the memory of a data processing device. The memory region identifier (243) may be used to identify the memory region upon which the upgrade routines and/or the downgrade routines specified by the entries (244, 246) are to be performed.

The index number (244.2) may be a numerical value. Each of the entries may have different numerical values. The index number (244.2) may be used to identify a bit of a memory region state map (204) associated with the entry. As will be discussed in greater detail with respect to FIGS. 3.1-3.2, the bits of the memory region state map (204) may be modified as upgrade routines or downgrade routines of entries of the example memory region state definition (240) are performed. By doing so, the memory region state map (204) may be updated to reflect the routines that have been performed. Consequently, the contents of the memory region state map (204) may be used to identify a current state of the device manager data and, in turn, an operating state of the device manager.

The upgrade routine identifier (244.4) may be an identifier of an upgrade routine stored in the code repository. Similarly, the downgrade routine identifier (244.6) may be an identifier of a downgrade routine stored in the code repository. These identifiers may be used to identify corresponding upgrade/downgrade routines associated with the respective entries (e.g., 244, 246).

The release identifier (244.8) may be an identifier of a release. Any number of the entries (e.g., 244, 246) may have the same release identifier (244.8) to indicate that all of the entries having the same release identifier (244.8) must be utilized by a state manager to place the device manager data in a state associated with the release. Consequently, the state manager may place the device manager in an operating state associated with a release by performing all of the upgrade and/or downgrade routines associated with entries having the same release identifier (244.8).

Thus, using the data structures illustrated in FIGS. 2.2-2.3, the state manager may (i) identify a current state of device manager data and (ii) select upgrade routines and/or downgrade routines to modify the operation of the device manager data to place the device manager into desired operating states. The state manager may then perform the identified routines.

Further, the aforementioned arrangement and selection of data in these data structures may facilitate efficient development and testing of new upgrade and/or downgrade routines. For example, the aforementioned data structures may enable different upgrade routine and/or downgrade routine branches to be developed. Such routines may be developed in parallel without impacting the ability of the developed routines to be tested.

For example, consider a scenario where two different branches of upgrade and downgrade routines are to be developed. As a developer develops a first branch, the developer may lock, or otherwise indicate, a lowest unlocked index number of an entry. The developer may populate that entry with the developed upgrade routine identifier and downgrade routine identifier corresponding with the developed upgrade routine and downgrade routine of the branch.

When a second developer begins development of a second branch, the second developer may identify that the index number utilized by the first developer is locked. Consequently, the second developer may utilize the next lowest unlocked index number (e.g., 244.2) that is greater than the locked index number. The second developer may populate that entry with the developed upgrade routine identifier and downgrade routine identifier corresponding with the developed upgrade routine and downgrade routine of the second branch.

Using this approach, a code repository may be developed that enables device manager data to be efficiently modified to change the operating state of the device manager to correspond to different releases. For example, if two branches are incompatible, the operating state of the device manager may be updated to reflect a first branch using the upgrade routines associated with the first branch. In this state, testing may be performed. After testing, the operating state of the device manager may be reverted using the downgrade routines corresponding to the utilized upgrade routines. A second set of upgrade routines may then be employed to match the operating state of the device manager to that associated with the second branch. Additional testing may then be performed in the second operating state. For additional details regarding code development, refer to FIG. 4.

Returning to FIG. 1, the operation of the data processing device (100) may be updated by modifying device manager data stored in memory. FIG. 3.1 illustrates a method that may be performed by the data processing device (100) of the system of FIG. 1 changing its operation.

FIG. 3.1 shows a flowchart of a method in accordance with one or more embodiments of the invention. The method depicted in FIG. 3.1 may be used to modify the operation of a data processing device in accordance with one or more embodiments of the invention. The method shown in FIG. 3.1 may be performed by, a state manager (e.g., 104, FIG. 1). Other components of the data processing device (100) illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a code update request for a new state for device manager is obtained.

In one or more embodiments of the invention, the new state of the device manager is a new operating state. The new operating state may be associated with a release. The release may be associated with the release definition include in a code repository (e.g. 220).

In one or more embodiments of the invention, the code update request is obtained from a user. For example, user may be a user of the data processing device that hosts the state manager performing the method illustrated in FIG. 3.

The code update request may be obtained from other entities without departing from the invention. For example, an administrator may be utilizing a computing device operably connected to the data processing device. The code update request may be obtained from the computing device in response to input from the administrator utilizing the computing device.

In step 302, state manager code is injected to begin execution of the state manager.

In one or more embodiments of the invention, injecting the state manager code may suspend functionality of the device manager hosted by the data processing device. For example, the data processing device may inject the state manager code in response to obtaining the code update request. By doing so, the processing resources of the computing device may be directed towards performance of the functionality of the state manager.

In one or more embodiments of the invention, a portion of the functionality of the device manager continues to be provided while the functionality of the state manager is provided. For example, requests for services provided by the device manager may be queued while the functionality of the state manager is provided.

In step 304, device manager data is updated using a code repository and one or more memory region state maps to obtain an updated device manager.

In one or more embodiments of the invention, the device manager data is updated using the code repository and the one or more memory region state maps by (i) identifying a state of the device manager data, (ii) identifying one or more upgrade routines and/or downgrade routines to be performed to obtain the updated device manager, and (iii) performing the identified one or more upgrade routines and/or downgrade routines.

In one or more embodiments of the invention, the device manager data is updated via the method illustrated in FIG. 3.2. The device manager data may be updated via other methods without departing from the invention.

As discussed above, modifying the device manager data may cause the device manager, after the modification of the device manager data, to operate in a different manner prior to the modification of the device manager data. Thus, by modifying the device manager data the operation of the device manager may be conformed to a predetermined operating state. Consequently, the operating state of the device manager may be conformed to an operating state specified by the code update request.

In step 306, the state manager code is extracted to resume execution of the updated device manager.

In one or more embodiments of the invention, extracting the state manager code suspends execution of the state manager while resuming execution of the updated device manager. By doing so, queued requests for services from the device manager may be resumed. Consequently, the modification of the operation of the device manager may be performed seamlessly from the perspective of the clients receiving services from the data processing device.

The method may end following step 306.

Thus, via the method illustrated in FIG. 3.1, device manager data stored in memory of a data processing device may be updated while services provided by the device manager are provided. By doing so, the operation of the device manager, post modification of the device manager data in memory, may be modified. Consequently, upgrades and/or downgrades of the functionality of the device manager may be made seamlessly (e.g., unseen/ascertained by clients utilizing services provided by the data processing device).

As discussed above, when updating the operating state of the device manager, device manager data in memory may be updated. FIG. 3.2 shows a flowchart of a method in accordance with one or more embodiments of the invention. The method depicted in FIG. 3.2 may be used to modify the operation of a data processing device in accordance with one or more embodiments of the invention. The method shown in FIG. 3.2 may be performed by, a state manager (e.g., 104, FIG. 1). Other components of the data processing device (100) illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In the following steps, device manager data stored in a memory region may be updated. The processes may be repeated and/or performed in parallel for any number of memory regions to update device manager data stored in any number of memory regions.

In step 320, a memory region of memory is selected.

The memory region of memory may be selected based on an identifier included in a memory region state definition (e.g., 240, FIG. 2.3).

In step 322, a state of the device manager data in the selected memory region is identified using a memory region state map.

The memory region state map may be included in the selected memory region. As discussed above, the memory region state map may include information that allows the state of the device manager data in the memory region to be identified.

In step 324, an index number of the memory region state definition, associated with the region, is identified based on the state of the device manager data. As discussed above, the memory region state map may include bits corresponding to each of the entries of the memory region state definition. The identified index number may be the highest index number of the entries for which a corresponding bit in the memory region state map has been set. When a bit in the memory region state map is set, the bit indicates that in upgrade routine associated with the corresponding entry has been previously performed on the device manager data located in the memory region.

In step 326, it is determined whether a state upgrade or a state down grade is being performed. The determination may be made based on the contents of the code update request of step 300 and FIG. 3.1. For example, the code update request may indicate an upgrade or a downgrade by specifying a desired operating state of the device manager. The desired operating state of the device manager may be compared to an existing operating state the device manager indicated by the memory region state map to identify whether the code update request is an upgrade or a downgrade request.

If it is determined that the code update request is an upgrade request, the method may proceed to step 328. If it is determined that the code update request is a downgrade request, the method may proceed to step 332.

In step 328, upgrade routines specified by entries of the memory region state definition having index numbers within an upgrade range based on the new state are performed.

As discussed above, the entries of the memory region state definition may include identifiers of upgrade routines. The upgrade routines specified by the upgrade routine identifiers of the entries within the upgrade range may be performed. By doing so, the device manager data in the memory region may be modified to modify the operating state of the device manager to match the new state.

The upgrade range may be index numbers having values between the index number identified in Step 324 and an index number of an entry corresponding to the new state. The upgrade range may include any number of index numbers. For example, the upgrade range may be all of the index numbers equal to or larger than the index number identified in Step 324. Thus, all of the upgrade routines specified by upgrade routine identifiers included in the entries having the aforementioned index numbers may be performed or may be caused to be performed by the state manager.

In step 330, the memory region state map is updated based on the indexed numbers of the entries for which their upgrade and/or downgrade routines were performed in steps 328 and/or 332. The memory region state map may be updated by, for each upgrade routine performed in Step 328, setting a bit corresponding to each entry that included an upgrade routine identifier corresponding to a performed upgrade routine to indicate that the upgrade routine of the entry had been performed (e.g., set the corresponding bits to 1). The memory region state map may be updated by, for each downgrade routine performed in Step 332, setting a bit corresponding to each entry that included a downgrade routine identifier corresponding to a performed downgrade routine to indicate that the downgrade routine of the entry had been performed (e.g., set the corresponding bits to 0).

For example, consider a scenario where a memory region state map is 111000 where the highest number bit corresponds to a first entry of a memory region state definition, the next highest bit corresponds to a second entry of the memory region state definition, etc. Thus, the memory region state map indicates that the upgrade routines associated with the first three entries of the memory region state definition have been performed on device manager data stored in the memory region associated with the memory regions state definition.

Continuing with the example, a downgrade request is received to conform the behavior of the device manager to that associated with a release associated with the first two entries of the memory region state definition. In response, a state manager may perform the downgrade routine of the third entry (resulting on device manager data that causes the device manager have an operating state consistent with the release) and may set the third highest bit of the memory region state map to 0 resulting in a memory region state map of 110000. Thus, the resulting memory region state map now reflects the operating state of the device manager and indicates that only the upgrade routines of the first two entries of the memory region state definition have been performed on the device manager data in the memory region.

The method may end following Step 330.

Returning to step 326, the method may proceed to Step 332 when it is determined that the code update request is a downgrade.

In Step 332, downgrade routines specified by entries of the memory region state definition having index numbers within a downgrade range based on the new state are performed.

As discussed above, the entries of the memory region state definition may include identifiers of downgrade routines. The downgrade routines specified by the downgrade routine identifiers of the entries within the downgrade range may be performed. By doing so, the device manager data in the memory region may be modified to adjust the operating state of the device manager to match the new state.

The downgrade range may be index numbers having values between the index number identified in Step 324 and an index number of an entry corresponding to the new state. The downgrade range may include any number of index numbers. For example, the downgrade range may be all of the index numbers equal to or less than the index number identified in Step 324 and greater than an index number associated with the new state.

The method may proceed to Step 330, discussed above, following Step 332.

Thus, via the method illustrated in FIG. 3.2, a selected number of upgrade and/or downgrade routines may be performed to modify device manager data. By doing so, the device manager functionality may be updated to reflect the new operating state implicated by the code updating request obtained in step 300.

As discussed above, the arrangement of information included in a code repository (e.g., 220) may facilitate the simultaneous development of upgrade routines and downgrade routines for any number of branches.

Figure 4:
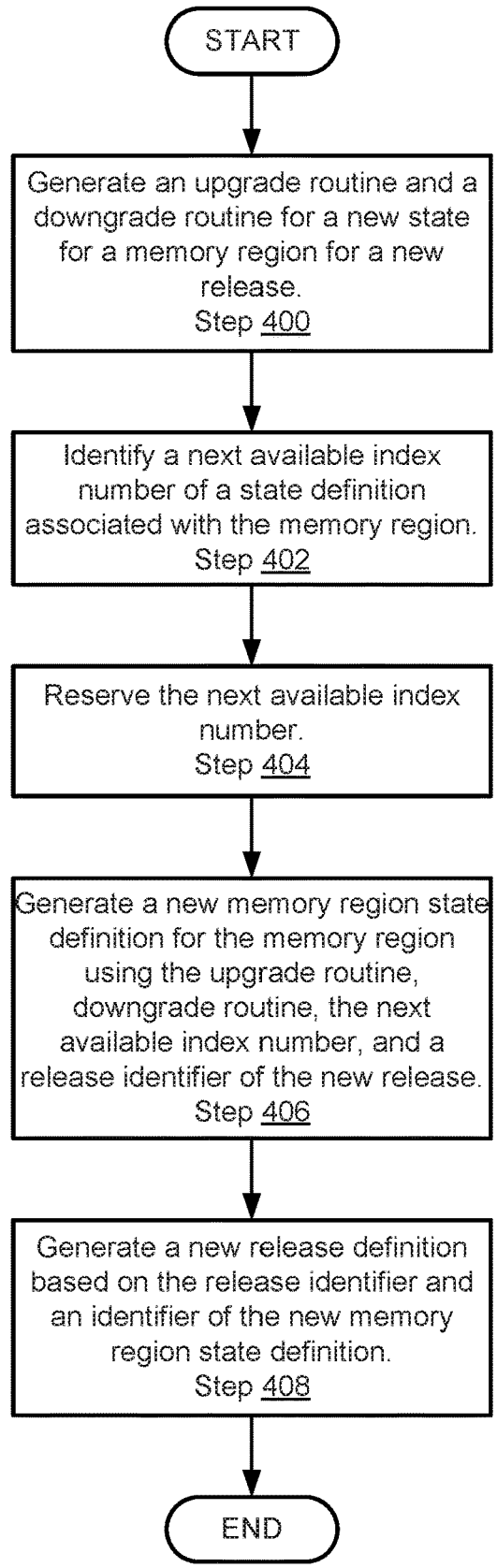
FIG. 4 shows a flowchart of a method of managing a code repository used to update the device manager in accordance with one or more embodiments of the invention.

FIG. 4 shows a flowchart of a method in accordance with one or more embodiments of the invention. The method depicted in FIG. 4 may be used to manage branches in accordance with one or more embodiments of the invention. The method shown in FIG. 4 may be performed by, a software developer.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, an upgrade routine and a downgrade routine for a new state for a memory region for new releases are generated. As discussed above, the upgrade routine may be used to modify device manager data in a memory region the update the operation of the device manager. Similarly, the downgrade routine may be used to revert the device manager data in the memory region to reflect a state prior to performance of the upgrade routine.

For example, consider a scenario in which an upgrade routine modifies a table included in device manager data to increase the size of the table. A corresponding downgrade routine may modify the table included in the device data to revert the size of the table to match the size of the table prior to performing the upgrade routine.

Each of the routines may include any type of information that enables the aforementioned routines to be performed.

In step 402, a next available index number of the state definition associated with the memory region is identified.

In one or more embodiments of the invention, the next available index number may be the index number of an entry having a lowest value that is not locked. As will be discussed in greater detail below, when an upgrade routine and/or downgrade routine are developed an entry for routines may be locked.

Locking an entry may be performed by adding metadata to a code repository that indicates that the entry is locked.

In step 404, the next available index number is reserved. The next available index number may be reserved by locking the entry corresponding to the index number.

In step 406, a new memory region state definition for the memory region is generated using the upgrade routine, the downgrade routine, the next available index number, and release identifier of the new release. The new memory segment state definition may be similar to the example memory region state definition (240) illustrated in FIG. 2.3. The new memory region state definition may be generated by instantiating a data structure for the new memory region state definition and populating instantiated data structure with an entry based on the upgrade routine, the downgrade routine, the next available index number, and the release identifier of the new release. The new memory region state definition may also include entries corresponding to a past memory region state definition for the memory region.

In step 408, the new release definition is generated based on the release identifier and an identifier of the new memory region state definition. The new release definition may be generated by instantiating a data structure and populating the data structure with the release identifier and/or identifier of the new memory region state definition.

After the new release definition is generated, the new memory region state definition and/or the new release definition may be added to an existing code repository.

The method may end following step 408.

Thus, via the method illustrated in FIG. 4, any number of branches may be simultaneously developed by any number of developers. For example, conflicts between branches may be avoided by requiring that the developers proactively lock index numbers corresponding to the upgrade routines and/or downgrade routines that they are developing. By doing so, index number conflicts between multiple developers may be avoided.

To further clarify embodiments of the invention, a non-limiting example is provided in FIGS. 5.1-5.6. Each of these figures may illustrate a similar system and/or data used by a similar system to that illustrated in FIG. 1 at different points in times. For the sake of brevity, only a limited number of components of the system of FIG. 1 are illustrated in each of FIGS. 5.1-5.6.

Example

Consider a scenario as illustrated in FIG. 5.1 in which a data processing device (500) is providing services to other entities (not shown). To provide such services, the data processing device (500) uses a first memory region (512) of a memory (510). The first memory region (512) includes a 100 element buffer (514) and 50 element buffer (516). Due to the structure and presence of these buffers, the data processing device (500) operates in a predetermined manner because a device manager (not shown) operates in accordance with the structure and content of these elements stored in the first memory region (512).

The first memory region (512) also includes a memory region state map (518). The memory region state map (518) includes a bitmap of 111000. This bitmap indicates that upgrade routines associated with three entries of a memory region state definition associated with the first memory region (512) have been performed on the first memory region (512).

While providing services, users of the services provided by the data processing device (500) complain about the responsiveness of the services provided by the data processing device (500). In response to the feedback, software developers analyze the operation of the data processing device (500) and providing the aforementioned services and make a determination that the operation could be improved. In response to this determination, the software developers develop different routines for modifying the operation of the data processing device (500) as illustrated in FIG. 5.2.

FIG. 5.2 shows a diagram of a code repository (520). The code repository (520) includes a first upgrade routine (522) and a first downgrade routine (524) developed by a first software developer as part of a first branch for the operation of the data processing device (500). The first upgrade routine (522) specifies that 100 element buffer is to be divided into four 25 element buffers. The first downgrade routine (524) specifies that the four 25 element buffers are to be combined into a 100 element buffer.

The code repository (520) also includes a second upgrade routine (526) and a second downgrade routine (528) developed by a second software developer as part of a second branch for the operation of the data processing device (500). The second upgrade routine (526) specifies that the 100 element offer is to be divided into two 50 element buffers. The second downgrade routine (528) specifies that the two 50 element buffers are to be combined into a 100 element buffer. Thus, the first upgrade routine (522) may be reverted by the first downgrade routine (524) and the second upgrade routine (526) may be reverted by the second downgrade routine (528).

To integrate each of these branches into future releases, the first software developer identifies that a memory region state definition (540) illustrated in FIG. 5.3 for the first memory region (512) includes a fourth entry (542) having a lowest index number that is unlocked (the memory regions state definition (540) includes three entries having lower index numbers but are not shown here for brevity). In response, the first software developer locks the fourth entry and populates the fourth entry (542) to indicate that the first upgrade routine is to be performed when upgrading the operation of the data processing device to reflect branch A and that the first downgrade routine is to be performed when downgrading the operation of the data processing device to reflect the state prior to branch A (i.e., the trunk).

After the first software developer updates the memory region state definition (540), the second software developer desires to integrate branch B into future releases. To do so, the second software developer identifies that the memory region state definition (540) includes a fifth entry (544) having a lowest index number that is unlocked. In response, the second software developer locks the fifth entry and populates the fifth entry (544) to indicate that the second upgrade routine is to be performed when upgrading the operation of the data processing device to reflect branch B and that the second downgrade routine is to be performed when downgrading the operation of the data processing device to reflect the prior state to branch be (i.e., the trunk).

To initiate testing of both branches, the data structures of FIGS. 5.2 and 5.3 are stored in persistent storage of the data processing device. After storing the data structures, an administrator initiates an upgrade for branch A. Doing so causes the first upgrade routine to be performed which results in the 100 element buffer being divided into separate 25 element buffers as illustrated in FIG. 5.4. Specifically, the first memory region (512) now includes four 25 element buffers (514.2, 514.4, 514.6, 514.8). Additionally, the memory region state map (518) has been updated to reflect that the first upgrade routine, as specified by the fourth entry of the memory region state map, has been performed. Specifically, the memory regions state map (518) includes the bit map 111100. The fourth highest bit has been changed from a 0 to a 1 (i.e. 111000→111100).

The data processing device (500) is then subjected to testing to determine whether branch A addresses the issues regarding the services provided by the data processing device (500) identified by the clients utilizing the services offered by the data processing device (500). Based on the testing, it is determined that branch A did not address the issues.

In response, the administrator roles back the modifications to the first memory region (512) as illustrated in FIG. 5.5. The administrator does so by causing a state manager of the data processing device to perform the first downgrade routine which merges the 25 element buffers back into the 100 element buffer (514). Additionally, the memory region state map (518) is updated to reflect that the first upgrade routine of the fourth element of the memory region state definition has been reverted. Specifically, the memory region state map includes a bit map of 111000.

After reverting, the administrator initiates an upgrade for branch B. Doing so causes the second upgrade routine to be performed which results in the 100 element buffer (514) into two 50 element buffers (514.10, 514.12) as illustrated in FIG. 5.6. Additionally, the memory region state map (518) is updated to reflect that the second upgrade routine of the fifth element of the memory region state definition has been performed. Specifically, the memory region state map (518) includes the bit map 111010 which indicates that the upgrade routines of the first, second, third, and fifth entries of the memory region state definition have been performed.

The data processing device (500) is then subjected to testing to determine whether branch B addresses the issues regarding the services provided by the data processing device (500) identified by the clients utilizing the services offered by the data processing device (500). Based on the testing, it is determined that branch B did address the issues. Consequently, branch B may be merged into the root to generate a new general release.

End of Example

Figure 6:
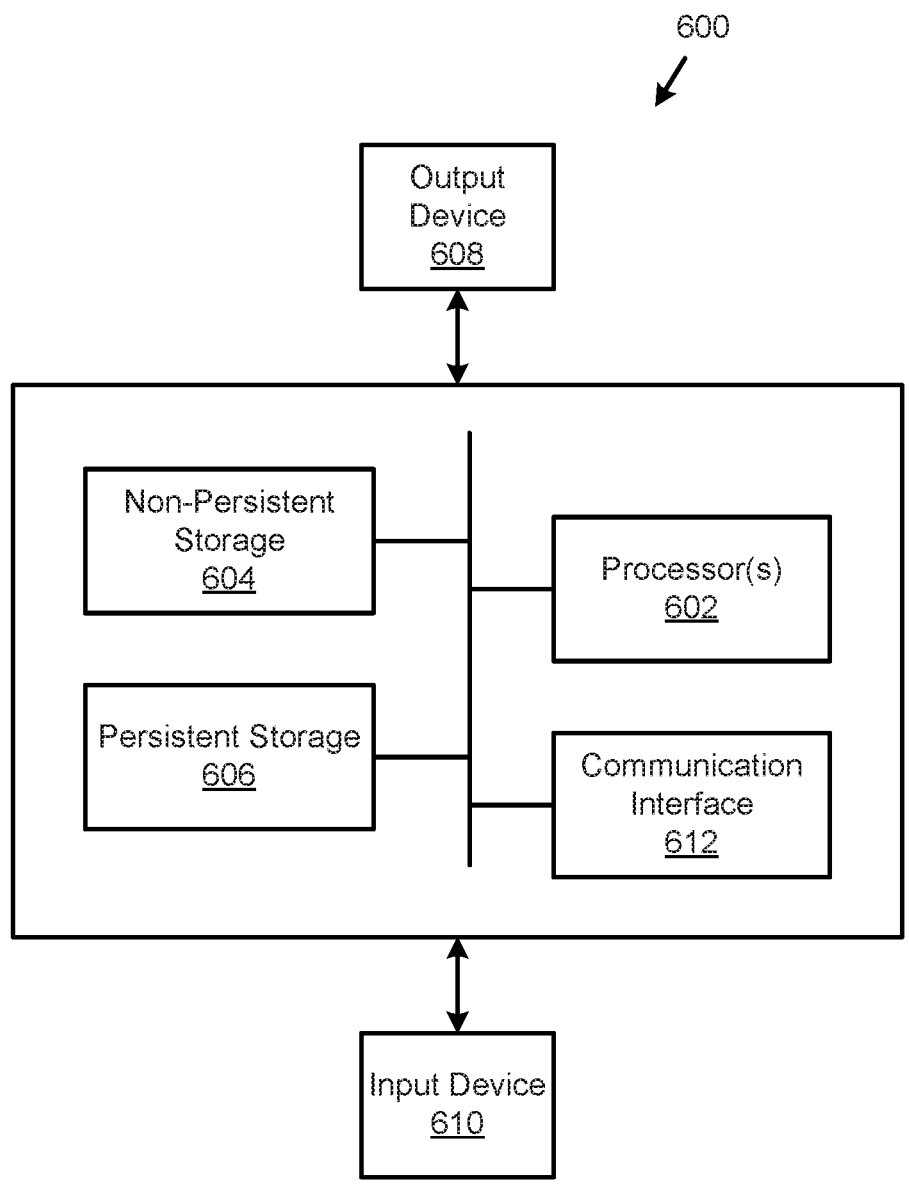
FIG. 6 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for managing upgrading and/or downgrading of functionality of a data processing. Embodiments of the invention may do so by tracking the addition, modification, and/or removal of data from memory. The functionality of the data processing device may depend on the type, quantity, and structure of data stored in the memory.

Thus, embodiments of the invention may address the problem of the state management of a data processing device. Specifically, embodiments of the invention may provide a method of tracking a current state of a data processing device which enables the functionality of the data processing device to be efficiently managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data processing device for providing data storage services, comprising:
   memory;
   persistent storage for storing a code repository;
   a device manager comprising circuitry that provides the data storage services based, in part, on device manager data stored in memory regions of the memory; and
   a state manager comprising circuitry programmed to:
      obtain a code update request for a new state for the device manager;
      inject state manager code to begin execution of the state manager in response to obtaining the code update request;
      update the device manager data using the code repository and a memory region state map to obtain an updated device manager,
         wherein the memory region state map comprises a bit map reflecting which routines have been performed to modify the device manager data,
         wherein the routines are each either an upgrade routine or a downgrade routine,
         wherein updating the device manager data using the code repository and the memory region state map to obtain the updated device manager comprises:
            selecting a memory region of the memory regions;
            identifying a state of the device manager data in the selected memory region using the memory region state map; and
            comparing the code update request and the memory region state map to determine whether the code update request is for a downgrade or an upgrade; and
      extract the state manager code to resume execution of the updated device manager.

2. The data processing device of claim 1, wherein updating the device manager data using the code repository and the memory region state map to obtain the updated device manager further comprises:
   identifying an index number of a state definition of the code repository, associated with the memory region, based on the state of the device manager data;
   making a determination, based on the comparison of the code update request and the memory region state map, that the code update request is for an upgrade of the device manager;
   in response to the determination:
      performing an upgrade routine, specified by entries of the state definition having a second index number that is larger than the index number, based on the new state.

3. The data processing device of claim 1, wherein updating the device manager data using the code repository and the memory region state map to obtain the updated device manager further comprises:
   identifying an index number of a state definition of the code repository, associated with the memory region, based on the state of the device manager data;
   making a determination, based on the comparison of the code update request and the memory region state map, that the code update request is for a downgrade of the device manager;
   in response to the determination:
      performing a downgrade routine, specified by an entry of the state definition having a second index number that is smaller than the index number, based on the new state.

4. The data processing device of claim 1, wherein the code repository comprises:
   release definitions;
   memory region state definitions;
   upgrade routines, wherein the upgrade routine is one of the upgrade routines; and
   downgrade routines, wherein the downgrade routine is one of the downgrade routines.

5. The data processing device of claim 4, wherein each of the release definitions specifies that at least one of the memory region state definitions is to be implemented when the device manager is in a corresponding operating state.

6. The data processing device of claim 4, wherein each of the memory region state definitions specifies at least one upgrade routine of the upgrade routines for placing the device manager in a corresponding operating state from a previous operating state.

7. The data processing device of claim 4, wherein each of the upgrade routines specifies modifications to be made to a portion of the device manager data stored in a corresponding memory region of memory regions of the memory that, when the device manager is in a first predetermined operating state, places the device manager into a second operating state.

8. The data processing device of claim 7, wherein the first predetermined operating state is associated with a first version of the device manager and the second predetermined operating state is associated with a second version of the device manager that is more mature than the first version.

9. The data processing device of claim 4, wherein each of the downgrade routines specifies modifications to be made to a portion of the device manager data stored in a corresponding memory region of memory regions of the memory that, when the device manager is in a first predetermined operating state, places the device manager into a second predetermined operating state.

10. The data processing device of claim 9, wherein the first predetermined operating state is associated with a first version of the device manager and the second predetermined operating state is associated with a second version of the device manager that is less mature than the first version.

11. The data processing device of claim 1, wherein injecting the state manager code temporarily suspends functionality of the device manager.

12. The data processing device of claim 1, wherein extracting the state manager code temporarily resumes functionality of the device manager.

13. A method for providing data storage services, comprising:
   obtaining a code update request for a new state of a device manager;
   injecting state manager code to begin execution of a state manager in response to obtaining the code update request;
   updating device manager data using a code repository and a memory region state map to obtain an updated device manager,
      wherein the device manager data is stored in a memory region of memory of a data processing device hosting the device manager,
      wherein the memory region state map comprises a bit map reflecting which routines have been performed to modify the device manager data,
      wherein the routines are each either an upgrade routine or a downgrade routine, wherein updating the device manager data using the code repository and the memory region state map to obtain the updated device manager comprises:
  selecting a memory region of the memory regions;
  identifying a state of the device manager data in the selected memory region using the memory region state map; and
  comparing the code update request and the memory region state map to determine whether the code update request is for a downgrade or an upgrade; and
extracting the state manager code to resume execution of the updated device manager that provides the data storage services.

14. The method of claim 13, wherein updating the device manager data using the code repository and the memory region state map to obtain the updated device manager further comprises:
  identifying an index number of a state definition of the code repository, associated with the memory region, based on the state of the device manager data;
  making a determination, based on the code update request, that the code update request is for an upgrade of the device manager;
  in response to the determination:
    performing an upgrade routine, specified by entries of the state definition having a second index number that is larger than the index number, based on the new state.

15. The method of claim 13, wherein updating the device manager data using the code repository and the memory region state map to obtain the updated device manager further comprises:
  identifying an index number of a state definition of the code repository, associated with the memory region, based on the state of the device manager data;
  making a determination, based on the code update request, that the code update request is for a downgrade of the device manager;
  in response to the determination:
    performing a downgrade routine, specified by an entry of the state definition having a second index number that is smaller than the index number, based on the new state.

16. The method of claim 13, wherein the code repository comprises:
  release definitions;
  memory region state definitions;
  upgrade routines, wherein the upgrade routine is one of the upgrade routines; and
  downgrade routines, wherein the downgrade routine is one of the downgrade routines.

17. A non-transitory computer readable medium comprising computer readable program code, which when executed by a computer processor enables the computer processor to perform a method for providing data storage services, the method comprising:
  obtaining a code update request for a new state of a device manager;
  injecting state manager code to begin execution of a state manager in response to obtaining the code update request;
  updating device manager data using a code repository and a memory region state map to obtain an updated device manager,
    wherein the device manager data is stored in a memory region of memory of a data processing device hosting the device manager,
    wherein the memory region state map comprises a bit map reflecting which routines have been performed to modify the device manager data,
    wherein the routines are each either an upgrade routine or a downgrade routine,
    wherein updating the device manager data using the code repository and the memory region state map to obtain the updated device manager comprises:
      selecting a memory region of the memory regions;
      identifying a state of the device manager data in the selected memory region using the memory region state map; and
      comparing the code update request and the memory region state map to determine whether the code update request is for a downgrade or an upgrade; and
  extracting the state manager code to resume execution of the updated device manager that provides the data storage services.

18. The non-transitory computer readable medium of claim 17, wherein updating the device manager data using the code repository and the memory region state map to obtain the updated device manager further comprises:
  identifying an index number of a state definition of the code repository, associated with the memory region, based on the state of the device manager data;
  making a determination, based on the code update request, that the code update request is for an upgrade of the device manager;
  in response to the determination:
    performing an upgrade routine, specified by entries of the state definition having a second index number that is larger than the index number, based on the new state.

19. The non-transitory computer readable medium of claim 17, wherein updating the device manager data using the code repository and the memory region state map to obtain the updated device manager further comprises:
  identifying an index number of a state definition of the code repository, associated with the memory region, based on the state of the device manager data;
  making a determination, based on the code update request, that the code update request is for a downgrade of the device manager;
  in response to the determination:
    performing a downgrade routine, specified by an entry of the state definition having a second index number that is smaller than the index number, based on the new state.

20. The non-transitory computer readable medium of claim 17, wherein the code repository comprises:
  release definitions;
  memory region state definitions;
  upgrade routines, wherein the upgrade routine is one of the upgrade routines; and
  downgrade routines, wherein the downgrade routine is one of the downgrade routines.

* * * * *